(12) United States Patent
Moody et al.

(10) Patent No.: US 8,305,631 B2
(45) Date of Patent: Nov. 6, 2012

(54) IMAGE PROCESSING TO REDUCE IMAGE PRINTING TIME BASED ON IMAGE DIMENSION AND PRINT PASS THRESHOLDS OF PRINT APPARATUS

(75) Inventors: Jay T. Moody, Wayland, MA (US); Koen J. M. Dijks, Herten (NL); Jacob A. Hyman, Cambridge, MA (US)

(73) Assignee: Vistaprint Technologies Limited, Hamilton (BM)

( * ) Notice: Subject to any disclaimer, the term of this patent is extended or adjusted under 35 U.S.C. 154(b) by 907 days.

(21) Appl. No.: 12/243,563

(22) Filed: Oct. 1, 2008

(65) Prior Publication Data

US 2010/0079772 A1 Apr. 1, 2010

(51) Int. Cl.
*G06K 15/02* (2006.01)
*B41J 2/15* (2006.01)

(52) U.S. Cl. ............ 358/1.2; 358/1.9; 358/2.1; 358/3.1; 358/1.1; 358/1.5; 358/1.8; 358/2.99; 358/3.12; 358/502; 358/504; 358/538; 358/444; 358/426.95; 347/5; 347/12; 347/14; 347/15; 347/19; 347/32; 347/41; 347/42; 347/43; 347/45; 347/47; 347/54; 347/104; 347/115; 347/173; 347/174; 347/175; 347/232; 382/233; 382/235; 382/236; 382/282; 382/284; 382/305; 382/307

(58) Field of Classification Search ......................... None
See application file for complete search history.

(56) References Cited

U.S. PATENT DOCUMENTS

| | | | |
|---|---|---|---|
| 6,234,602 B1 * | 5/2001 | Soto et al. | 347/19 |
| 6,533,393 B1 | 3/2003 | Meyer et al. | |
| 6,585,342 B1 | 7/2003 | Mantell | |

(Continued)

FOREIGN PATENT DOCUMENTS

JP 05 183722 A 7/1993

OTHER PUBLICATIONS

Iwata, K. and Marcu, G.G.: "Computer simulation of printed colors on textile materials" Proceedings of SPIE, 1994, pp. 228-238, XP007905044 SPIE p. 234-238.

*Primary Examiner* — Steven Kau
(74) *Attorney, Agent, or Firm* — Jessica Costa

(57) ABSTRACT

A method is provided for processing an image to optimize print time of the image by a print apparatus based on the size of the image to be printed and the print pass thresholds of the print apparatus. A dimension of the image corresponding to the dimension along the sub-scanning axis of the image as it will be printed by the print apparatus is obtained, along with the corresponding number of print passes required to print the image. An analysis is performed to determine whether the size of the image could be reduced to require one less print pass by the print apparatus in printing the reduced image based on the proximity of the determined dimension to the range of dimensions that will result in one less print pass by the print apparatus. If the size of the image may be reduced such that the image could be printed in one less print pass while also meeting optional criteria such as enforcement of a maximum image reduction threshold, the image is scaled prior to printing to reduce the number of print passes performed by the print apparatus in printing the image.

17 Claims, 11 Drawing Sheets

U.S. PATENT DOCUMENTS

| | | |
|---|---|---|
| 6,863,372 B2 * | 3/2005 | Barckhahn et al. ............ 347/41 |
| 7,008,040 B2 * | 3/2006 | Nakajima ....................... 347/41 |
| 7,199,903 B2 | 4/2007 | Van de Capelle et al. |
| 7,407,260 B2 | 8/2008 | Reinten |
| 7,720,290 B2 * | 5/2010 | Shimura et al. ............... 382/209 |
| 2005/0179708 A1 | 8/2005 | Ben-Zur |
| 2005/0207675 A1 * | 9/2005 | Fuchigami et al. ........... 382/298 |
| 2007/0285445 A1 | 12/2007 | Li |

* cited by examiner

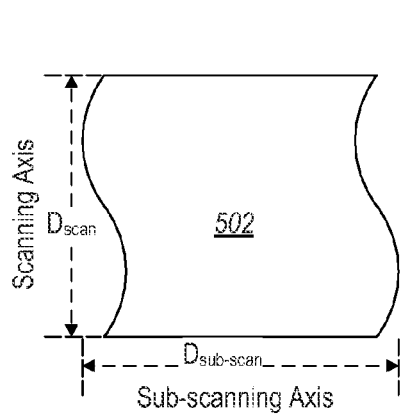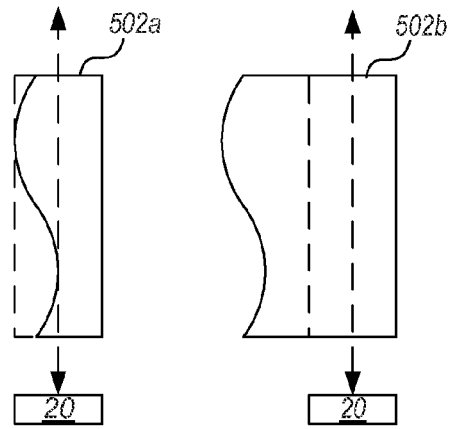
FIG. 5a     FIG. 5b     FIG. 5c
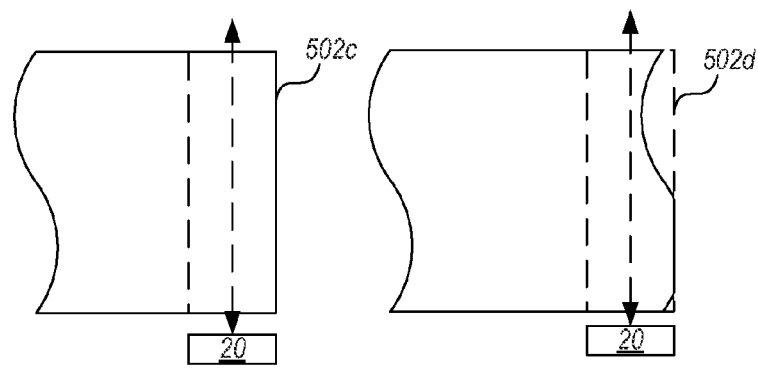
FIG. 5d     FIG. 5e
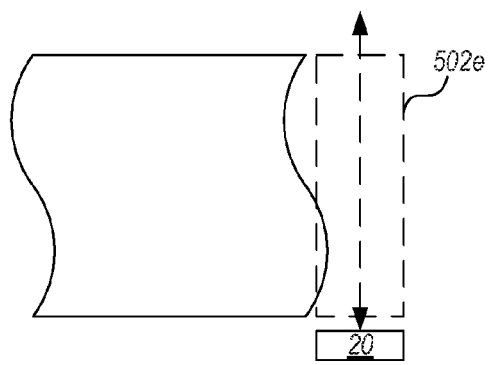
FIG. 5f

IMAGE PROCESSING TO REDUCE IMAGE PRINTING TIME BASED ON IMAGE DIMENSION AND PRINT PASS THRESHOLDS OF PRINT APPARATUS

FIELD OF THE INVENTION

The invention relates to the processing of a digital image to be printed and, more particularly, to processing of an image to reduce the image printing time by optimizing the size of the image based on the dimensions of the image and print pass thresholds of the print apparatus.

BACKGROUND OF THE INVENTION

Computerized images are commonly printed on products such as paper and garments. Such printing is often performed using ink or toner jet printers. An example of a commercial computer-to-textile inkjet printing system is the 93X Series of CMYK digital printers from Kornit Digital Ltd., which is described in U.S. patent publication US2005/0179708 entitled "Digital Printing Machine", and is hereby incorporated by reference herein for all that it teaches. Systems using ink jet printing technology involve placing the item to be printed on a printing table and holding the item in the proper position by means of a frame having an opening allowing the ink to be applied. The printing operation is performed while relative motion occurs in two axes. The printing table assembly bearing the item moves along a first axis, referred to herein as the "scanning" direction, while an assembly containing an array of printing heads, each having multiple inkjet nozzles, moves perpendicularly to the scanning direction, referred to herein as the "sub-scanning" direction.

Print heads employed in inkjet printers and the like usually each contain a plurality of nozzles arranged in (an) array(s). The nozzles usually are placed substantially equidistant. The distance between two contiguous nozzles defines the "nozzle pitch". In operation, the nozzles are controlled to image-wise discharge fluid droplets of a marking substance on an image-receiving medium. When the printer is of the scanning type, the print heads are movable in reciprocation across the image-receiving medium (along the main scanning axis). In such printers, the print heads are typically aligned along a sub-scanning axis that is perpendicular to the direction of the main scanning axis. In a traverse of the print heads across the image-receiving medium a matrix of image dots of a marking substance, corresponding to a part of an original image is formed on the image-receiving medium by image-wise activating nozzles of the print heads. The printed matrix is generally referred to as a "print swath", while the dimension of this matrix along the sub-scanning axis is referred to as the "swath width". After a first traverse, when a part of the image is completed, the image-receiving medium is displaced relative to the print heads along the sub-scanning axis enabling printing of a subsequent part of the image. When this displacement step is chosen equal to a swath width, an image can be printed in multiple non-overlapping swaths. However, image quality may be improved by employing printing devices enabling the use of multiple printing stages; hence printed swaths are at least partially overlapping. In the background art, two main categories of such printing devices can be distinguished, i.e. so-called "interlace systems" and "multi-pass systems".

In an interlace system, the print head contains N nozzles, which are arranged in (a) linear array(s) such that the nozzle pitch is an integer multiple of the printing pitch. Multiple printing stages, or so-called interlacing printing steps, are required to generate a complete image or image part. The print head and the image-receiving medium are controlled such that in M printing stages, M being defined here as the nozzle pitch divided by the printing pitch, a complete image part is formed on the image-receiving medium. After each printing stage, the image-receiving medium is displaced over a distance of M times the printing pitch. Such a system is of particular interest because it achieves a higher print resolution with a limited nozzle resolution.

In a "multi-pass system", the print head is controlled such that only the nozzles corresponding to selected pixels of the image to be reproduced are image-wise activated. As a result, an incomplete matrix of image dots is formed in a single printing stage or pass, i.e. one traverse of the print heads across the image-receiving medium. Multiple printing stages are required to complete the matrix of image dots. The image-receiving medium may be displaced along the sub-scanning axis in-between two passes.

The amount of time required to print an image depends on several factors, including at least the print resolution of the image to be printed and the size of the printed image. With regard to the print resolution, generally the nozzle pitch (defined as the distance between centers of two adjacent nozzles) is greater than the printing pitch (defined as the distance between centers of two contiguous dots of ink both along the main scanning axis and along the sub-scanning axis) at the desired print resolution, and hence several printing stages per swath are required. As referred to herein, a "print pass" is defined as the large step movement of the print head(s) to print one complete swath of the image at the desired resolution. In contrast, a "print stage" is defined as the small step movement of the print head(s) relative to the image receiving medium to perform a single scan and deposition of ink within a single swath. Accordingly, one or more print stages may be required per print pass to achieve the desired resolution.

With regard to the size of the printed image, images that are wider than a single swath along the sub-scanning axis are printed as multiple adjacent (over-lapping or non-overlapping) swaths. Since each swath is printed in one print pass, images that are wider along the sub-scanning axis must be printed as multiple swaths and require correspondingly multiple print passes. It will be evident that the more print passes required to print an image, the longer the total print time. The number of items that can be produced by a printing system during a given period of time is, of course, directly affected by the time required to print each item. If the time required to print images on at least some items could be reduced, the number of items that could be produced with the system during a period of time would increase accordingly.

SUMMARY

Embodiments of the present invention reduce, where possible, the printing time of images based on the dimension of the image along the sub-scanning axis and on the print pass thresholds specific to the particular print apparatus printing the image.

In an embodiment, a print apparatus comprises a print medium stage which holds a print medium on which an image is to be printed, at least one print head having at least one nozzle which deposits ink or other such marking substance on the print medium during printing, a scan control mechanism which controls relative movement of the print medium stage and the print head(s) along a scanning axis during deposition of ink from the at least one nozzle, a print head displacement control mechanism which displaces the print head(s) relative to the print medium stage along a sub-scanning axis perpendicular to the scanning axis, and an image filter. The print apparatus is configured to print the image on the print medium in a sequence of print passes, each print pass resulting in the printing of a single printed swath of the image along the scanning axis. The number of swaths of the printed image depends on the dimension of the image along the sub-scanning axis. The image filter is configured to determine a dimension of the image corresponding to the dimension along the sub-scanning axis of the image as it will be printed by the print apparatus, determine a number of print passes required to print the image having the determined dimension, determine whether the size of the image could be reduced to require one less print pass by the print apparatus in printing the reduced image, and if it is determined that the size of the image could be reduced to require one less print pass by the print apparatus in printing the reduced image, scale the image prior to printing such that the dimension along the sub-scanning axis of the scaled image is such as to require one less print pass by the print apparatus in printing the scaled image than the original image.

In another embodiment there is provided a method for processing an image to be printed by the print apparatus. The method includes the steps of determining a dimension of the image corresponding to the dimension along the sub-scanning axis of the image as it will be printed by the print apparatus, determining a number of print passes required to print the image having the determined dimension, determining whether the size of the image could be reduced to require one less print pass by the print apparatus in printing the reduced image, and if it is determined that the size of the image could be reduced to require one less print pass by the print apparatus in printing the reduced image, scaling the image such that the dimension along the sub-scanning axis of the scaled image is such as to require one less print pass by the print apparatus in printing the scaled image than the original image.

BRIEF DESCRIPTION OF THE DRAWINGS

FIG. 5a is an illustration of an example 5-print-pass image, and FIGS. 5b, 5c, 5d, 5e, and 5f are sequential schematic illustrations of the image as it is printed during operation of the print apparatus of FIG. 1 in the performance of printing a 5-print-pass image.

DETAILED DESCRIPTION

It will be understood that while the discussion herein describes an embodiment of the invention in the field of preparation of a customized printed t-shirt the invention is not so limited and is relevant to any application where the time required for a printing system to print an image on an item can be reduced by scaling the image such that its dimension along the sub-scanning axis, when printed, is reduced to the next lower print pass threshold, if available, as defined by the print apparatus. To minimize noticeable differences in the printed product, only images that may be scaled less than a predetermined maximum reduction threshold to reduce the image dimension along the sub-scanning axis such that the print apparatus will print the image using fewer print passes are actually scaled and printed in the reduced form. Furthermore, the image reduction scaling factor may be such as to scale the image such that the printed image dimension along the sub-scanning axis is maximized within the next lower level print pass dimension range.

Figure 1:
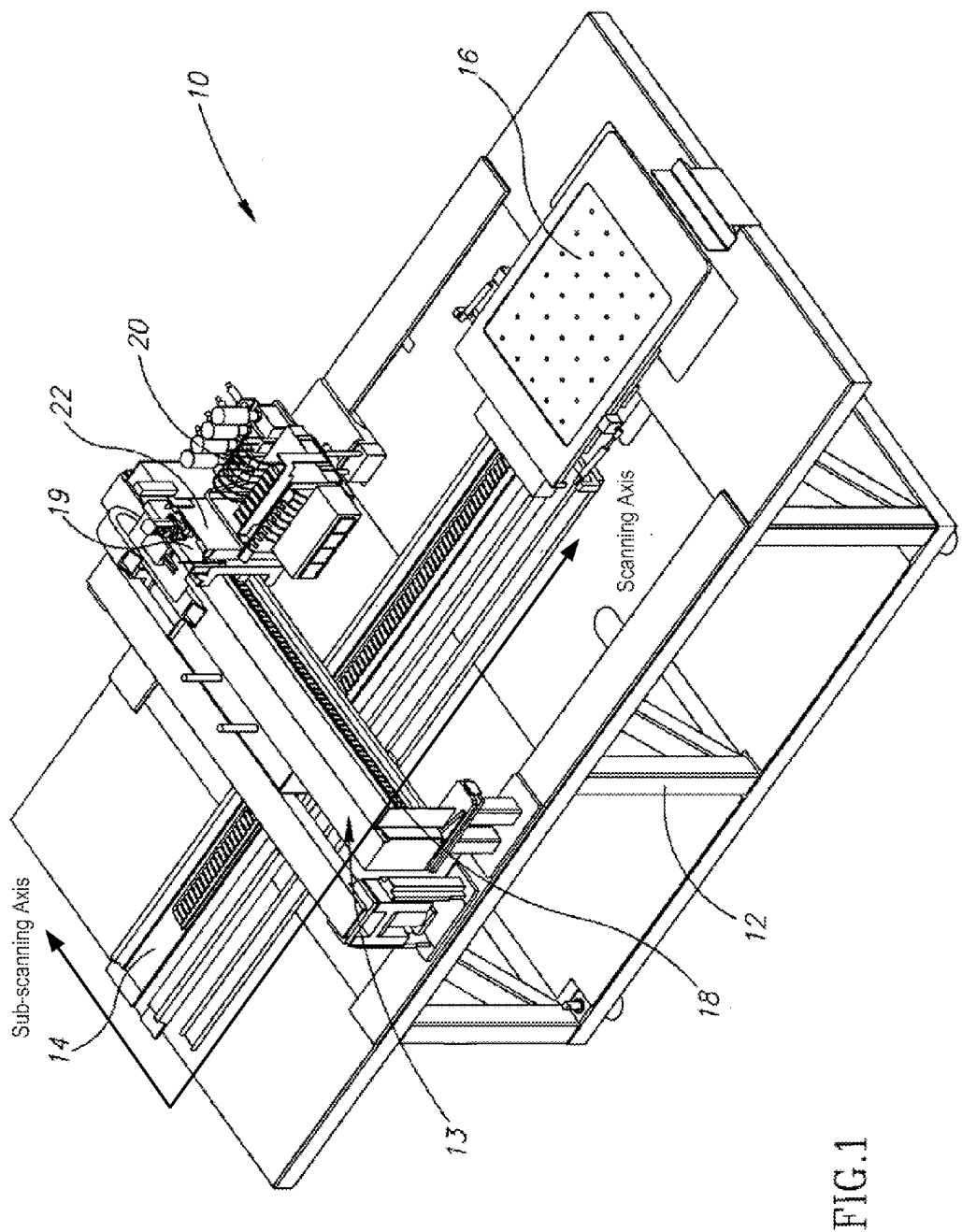
FIG. 1 illustrates a perspective view of an exemplary embodiment of an ink jet print apparatus with which the invention may be employed.

Turning now to FIG. 1, there is shown therein an ink or toner jet print apparatus 10, for example the previously mentioned Kornit 93X system described in U.S. Pat. Pub. US2005/0179708. Print apparatus 10 is based on a rigid frame 12 in which an accurate linear motion stage 14, which travels along an axis, which is referred to herein as the "scanning axis", is installed. A printing table assembly 16 is connected to stage 14, which preferably provides high acceleration and scanning speed. An accurate linear motion stage 18 is installed above printing table assembly 16, preferably on a bridge 13. The linear motion stage 18 is movable along an axis referred to as the "sub-scanning axis". The sub-scanning axis is perpendicular to the scanning axis. A printing heads array 20, including a plurality of inkjet nozzles, is supported on moving plate 19, to allow motion perpendicular to the direction of movement of printing table 16. That is, printing table 16 moves in a forward and reverse direction along the scanning axis and printing heads array 20 moves along the sub-scanning axis. It will be appreciated that, while the print apparatus 10 is particularly suited for printing on a finished garment, other media can alternatively be employed. The present invention will be described with regard to a finished garment, for ease of description by way of example.

Figure 2:
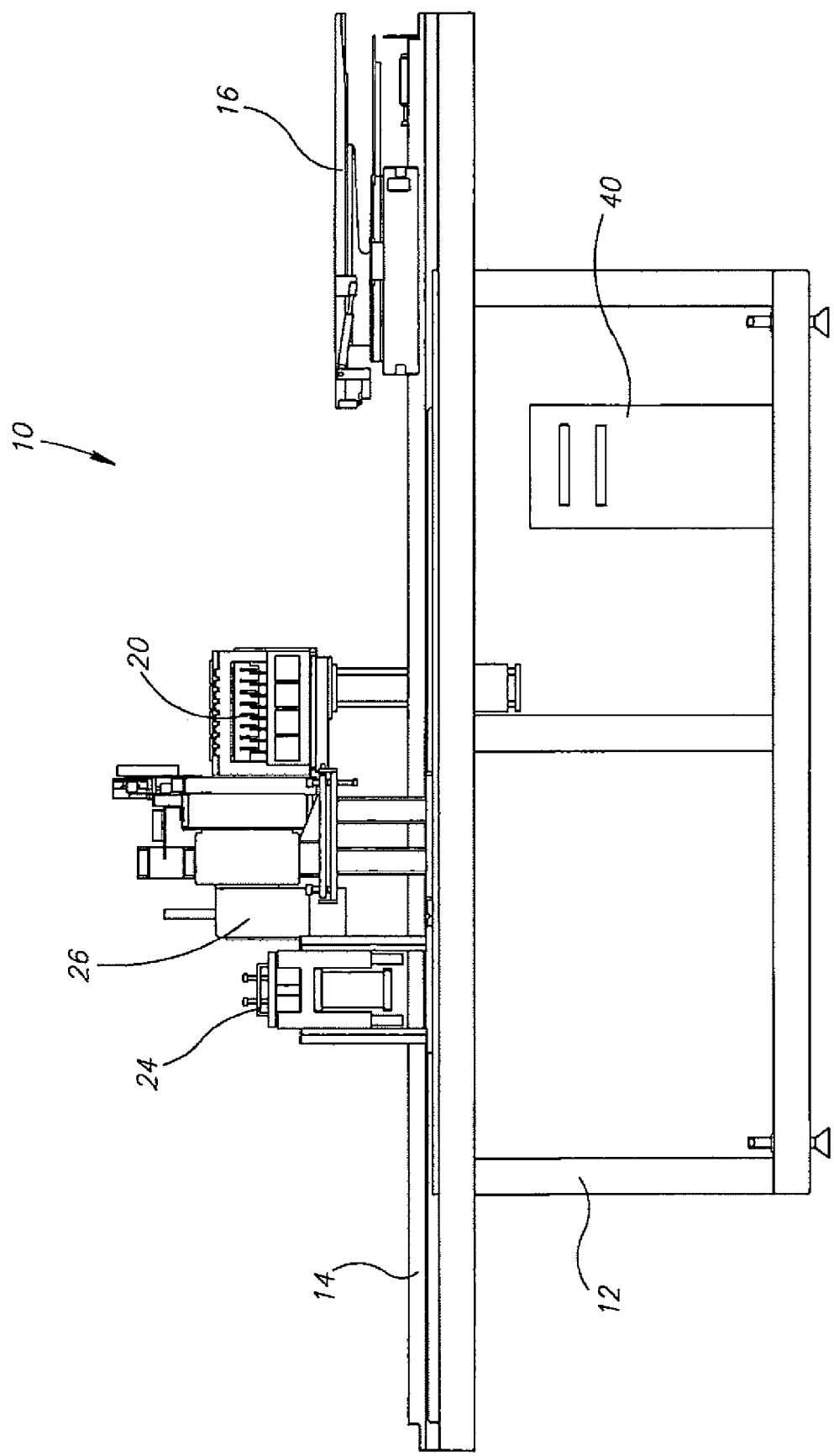
FIG. 2 illustrates a side view of the inkjet print apparatus of FIG. 1.

Referring now to FIG. 2, an ironing unit 24 and a curing unit 26 are supported on frame 12 above stage 14, preferably on a bridge, such that printing table assembly 16 can move underneath. The ironing unit 24 prepares the media for printing. The curing unit 26 may be, for example, a hot air blower or an infrared heating unit that evaporates the ink carrier as printing is accomplished or during print passes.

A main computer 40, preferably a microprocessor, controls the entire system, and is coupled to each of the various units for coordination, synchronization, and activation, in accordance with a pre-programmed printing process. Main computer 40 coordinates a large number of functions. Main computer 40 receives images from an image file, processes the images to be printed, activates the curing unit, and controls the motion systems, the ironing unit, and more. Preferably, movement of the stages 14 and 19 is coordinated by the microprocessor with the nozzles firing command by a print heads controller, so that precise printing of a desired object or symbol can be performed.

Figure 3:
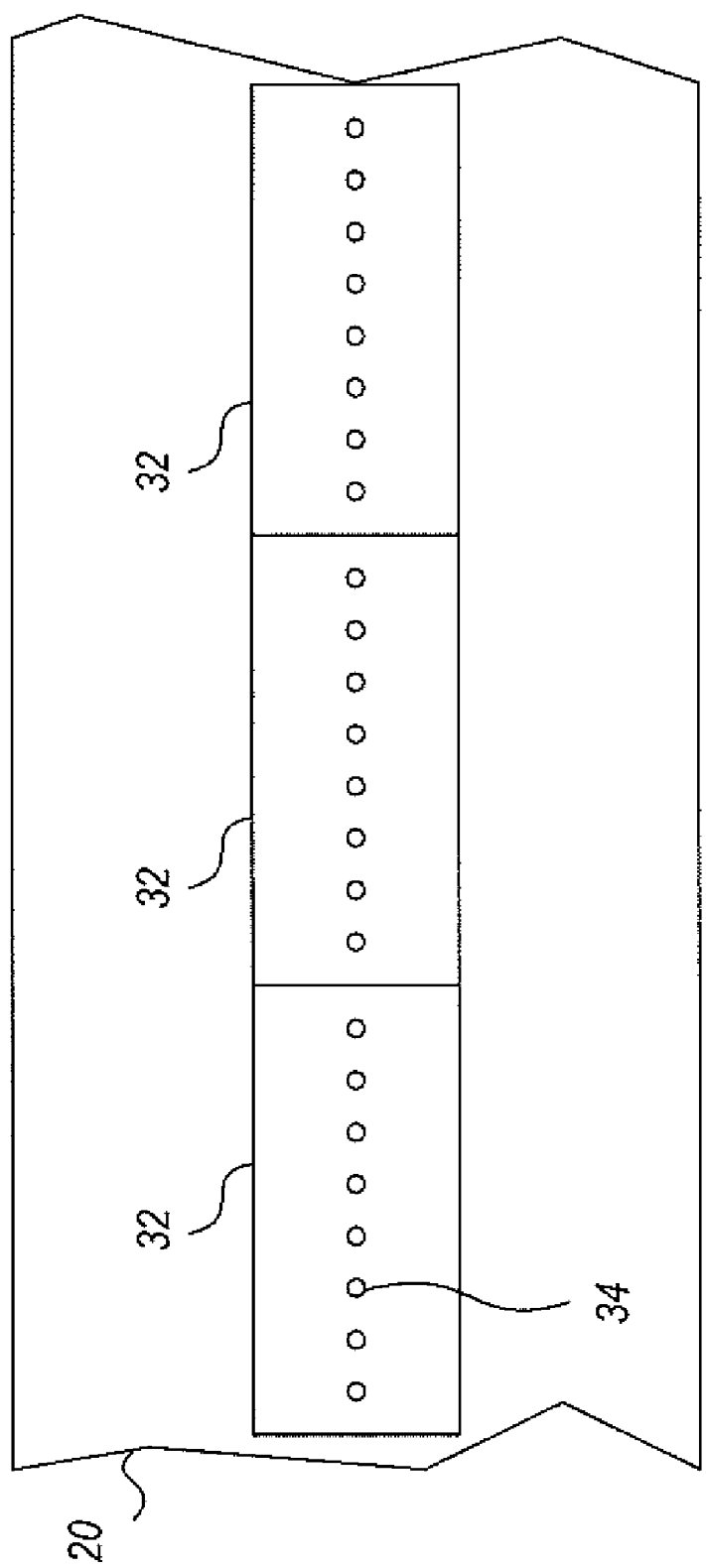
FIG. 3 is a schematic detail illustration of a portion of a printing heads array of the ink jet print apparatus of FIG. 1.
Figure 4D:
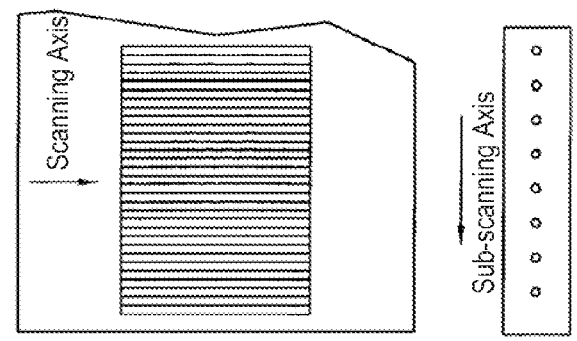
FIGS. 4a, 4b, 4c, and 4d are schematic illustrations of operation of the printing heads array of FIG. 3 in the performance of four sequential print stages.
Figure 4C:
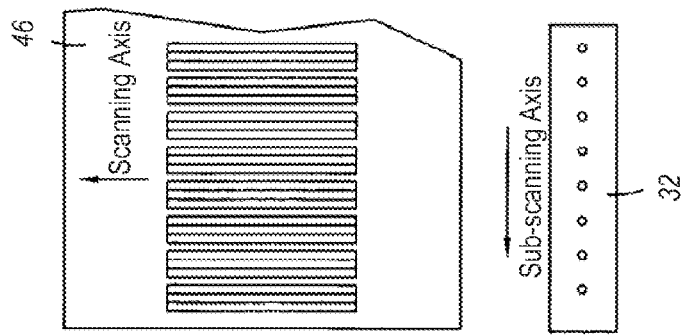
Figure 4B:
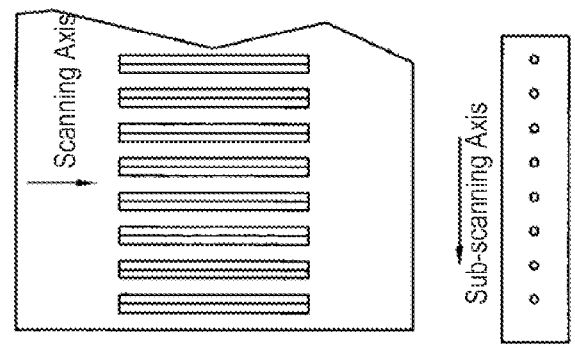
Figure 4A:
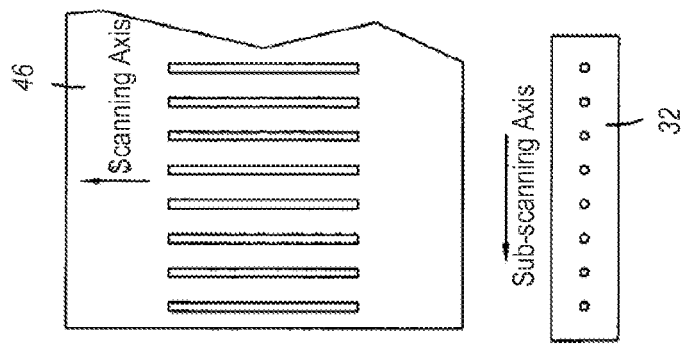

Print apparatus 10 also includes an array 20 of printing heads 32, shown schematically in FIG. 3, arranged for printing directly on a finished garment, a textile piece or other flexible or rigid image receiving medium. Printing heads array 20 includes a plurality of printing heads 32 including inkjet nozzles 34. Printing heads array 20 is a massive array of conventional piezoelectric drop-on-demand or continuous inkjet heads, which perform the high-speed printing. A print apparatus 10 may have hundreds or thousands of nozzles 34 provided for simultaneous printing. Each head 32 may hold several dozens of nozzles 34 which are controlled independently by main computer 40.

Generally, the distances between nozzles 34 and between printing heads 32 are bigger than the printing resolution; hence several print stages are needed to complete a single print pass to thereby print a complete swath of the image. FIGS. 4a-4d are schematic detail illustrations of a single printing head 32 and a portion of the image receiving medium 46 to be printed. After each print stage in the scanning along the scanning axis, here created by movement of the printing head 32 relative to the position of the printing table assembly 16 (with medium 46 thereon), the printing head 32 is displaced incrementally along the sub-scanning axis to prepare for the next print stage (traveling in the opposite direction along the scanning axis) in the print pass. These incremental displacements are small steps associated with each print stage as opposed to the large steps associated with each print pass/swath. It will be appreciated that the computer 40 is programmed to control the relative motion of the printing heads array 20 and the printing table assembly 16 so as to obtain this accurate and complete coverage.

The printing process is performed while relative motion occurs between the printing heads array 20 and printing table assembly 16. As stated above, the nozzle pitch may be greater than the printing pitch, and hence several print stages are needed to complete even a single swath of the image. A single swath of the image is printed by moving the printing table assembly 16 in one direction (e.g., forward) along the scanning axis, then displacing the printing heads assembly 20 by an incremental printing stage shift along the sub-scanning axis, moving the printing table assembly 16 in the opposite (e.g., reverse) direction along the scanning axis, then displacing the printing heads assembly 20 by another incremental printing stage shift along the sub-scanning axis, and repeating until a complete print swath is printed. Printing is performed as the table surface passes below the drop-on-demand inkjet nozzles array 32.

Unless the dimension along the sub-scanning axis of the image to be printed is less than or equal to the width of a single swath, an image is printed in multiple swaths.

FIG. 5a illustrates an example image 502 to be printed which, due to its dimensions, requires printing in multiple swaths. The dimensions of the image 502 are $D_{sub-scan}$ along the sub-scanning axis by $D_{scan}$ along the scanning axis. FIGS. 5b through 5f diagrammatically illustrate the printed image after the completion of the first print pass, the second print pass, the third pass, the fourth print pass, and the fifth (last) print pass, respectively. During each pass, a new swath 502a, 502b, 502c, 502d, 502e is printed. Thus, the image illustrated in FIG. 5a is printed by the print apparatus in five swaths.

In many instances, for example, in the example of FIGS. 5a-5f, the dimension, $D_{sub-scan}$, along the sub-scanning axis of the image to be printed is close to the maximum dimension of an image that could be printed with one fewer print passes. For example, referring to FIG. 5f, the swath 502e printed in the fifth print pass contains only a sliver of actual image content. If the image could be scaled such that the dimension, $D_{sub-scan}$, of the image corresponding to the sub-scanning axis were less than or equal to the maximum dimension of an image along the sub-scanning axis that can be printed by the print apparatus in only four print passes, the print time for printing the image would be reduced from the time it takes the print apparatus to print a five-pass image to that of the time it takes the print apparatus to print a four-pass image.

In order to take advantage of this type of optimization, for each integer number of possible print passes that the print apparatus is capable of printing for one image, the maximum dimension (along the sub-scanning axis) of an image that may be printed with only the corresponding print pass number is determined. The set of maximum dimensions, $D_{MAX\_1}$, $D_{MAX\_2}$, $D_{MAX\_3}$, $D_{MAX\_4}$, and $D_{MAX\_5}$, corresponding to associated print pass numbers are referred to herein as the "dimension thresholds". One may obtain the set of dimension thresholds $D_{MAX\_1}$, $D_{MAX\_2}$, $D_{MAX\_3}$, $D_{MAX\_4}$, $D_{MAX\_5}$ from the print apparatus manufacturer, or empirically.

In order to allow maximum flexibility to the system in the event of a change in print apparatus, in one embodiment, the set of maximum dimensions, $D_{MAX\_1}$, $D_{MAX\_2}$, $D_{MAX\_3}$, $D_{MAX\_4}$, and $D_{MAX\_5}$ and corresponding number of print passes are stored in a look-up table (LUT). The LUT may include additional information, for example, the range of measurement values of the image dimension for corresponding number of print passes. A LUT may also include information for different types of print apparatuses such that a single LUT may be distributed to multiple entities and only the information for the specific print apparatus in use is used by each entity.

TABLE 1 is an exemplary embodiment of a dimension threshold LUT specific to the Kornit 93X system.

TABLE 1

| Image Dimension Range (mm) along the Sub-Scanning Axis | Dimension Threshold (mm) | Number of Print Passes |
|---|---|---|
| <=61 | 61 | 1 |
| 62 up to 133 | 133 | 2 |
| 134 up to 205 | 205 | 3 |
| 206 up to 276 | 276 | 4 |
| >=277 | N/A | 5 |

Having obtained the dimension thresholds, $D_{MAX\_1}$, $D_{MAX\_2}$, $D_{MAX\_3}$, $D_{MAX\_4}$, $D_{MAX\_5}$, for corresponding numbers of print passes, it is possible to analyze an image to determine its size, determine the number, N, of print passes that will be performed if printed according to its original dimensions, and to make a determination of whether or not to scale down the image such that the image width (i.e., the dimension, $D_{sub-scan}$, along the sub-scanning axis) is equal to or less than the dimension threshold, $D_{MAX\_N-1}$, corresponding to one less print pass.

Figure 6:
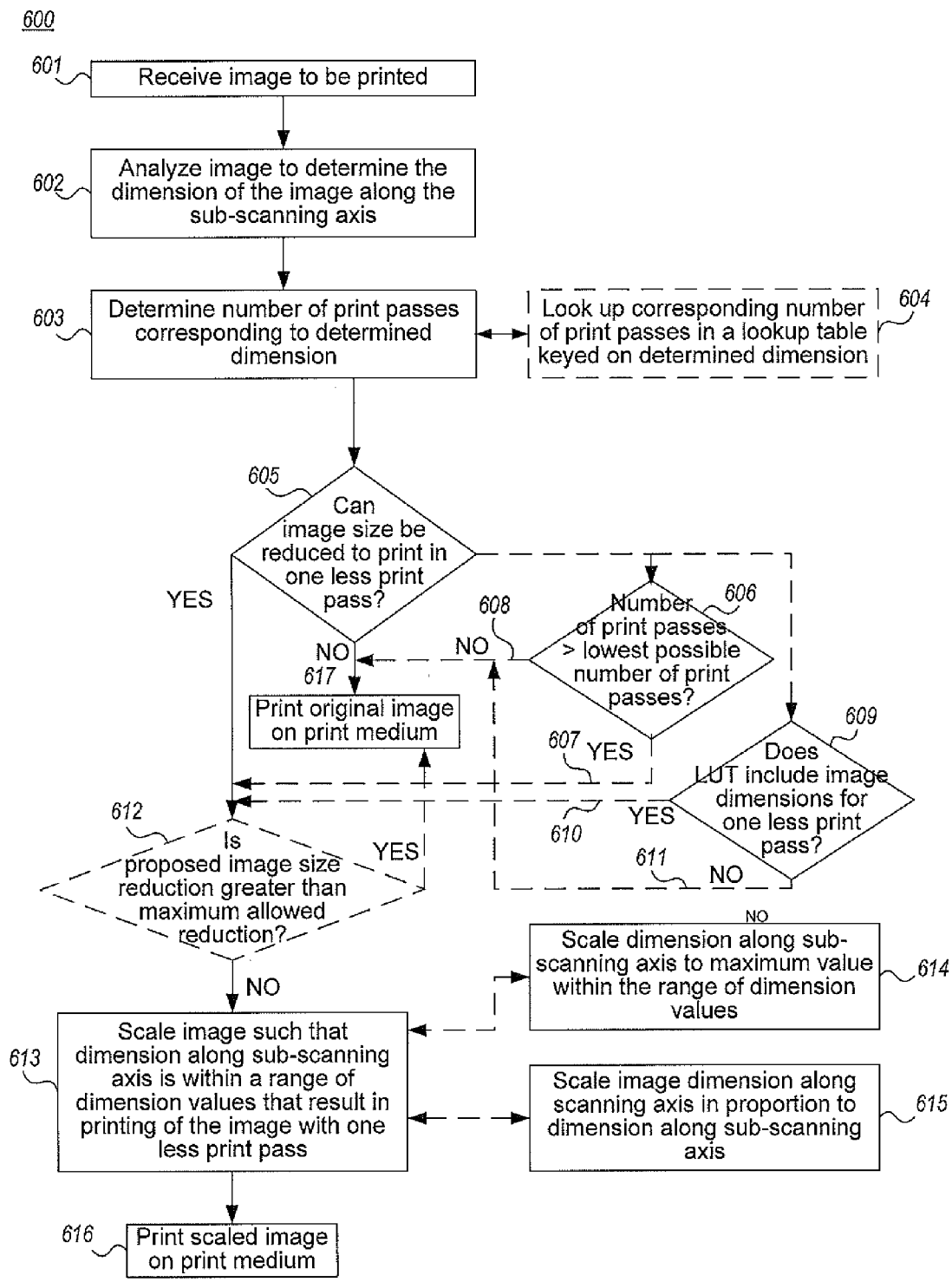
FIG. 6 is flow chart of an exemplary method embodying the invention.

FIG. 6 is a flowchart illustrating such a method. As illustrated, an image is received (step 601). The dimension, $D_{sub-scan}$, of the image which corresponds to the dimension along the sub-scanning axis of the image as it will be printed by the print apparatus is determined (step 602). For example, if the dimension, $D_{sub-scan}$, along the sub-scanning axis of an image to be printed on a t-shirt corresponds to the width of the image, the width of the image will be determined. Next, the number of print passes, N, required to print the image having the determined dimension, $D_{sub-scan}$, is determined (step 603). Thus, to continue the example, if the width of the image to be printed is determined to be 140 mm ($D_{sub\text{-}scan}$=140 mm), the number, N, of print passes required to print the image by the print apparatus characterized by the above table is three (3) print passes (N=3). In one embodiment, the dimension thresholds specific to the print apparatus and corresponding number of print passes are stored in a lookup table as exemplified in TABLE 1. In such an embodiment, the determined dimension, $D_{sub\text{-}scan}$, is utilized to obtain the corresponding number of print passes, N, from a lookup table (step 604).

Next, a determination is made as to whether the size of the image could be reduced to require one less print pass (i.e., N−1) by the print apparatus in printing the reduced image (step 605). For example, in an embodiment, a determination is made as to whether an image of the size of the image can be printed by the print apparatus in only one print pass, for example by determining whether the number of print passes required to print the image is greater than the lowest possible number of print passes (step 606), determining that the image can be reduced to require one less print pass if the number of print passes required to print the image is greater than the lowest possible number of print passes (step 607), and determining that the image cannot be reduced to require one less print pass if the number of print passes required to print the image is equal to the lowest possible number of print passes (step 608). If a lookup table is being utilized, this can be accomplished by determining whether the lookup table includes acceptable dimensions for one less print pass than the number of print passes required to print the image (i.e., does N−1 exist in LUT?) (step 609), determining that the image can be reduced to require one less print pass if the lookup table includes acceptable dimensions for one less print pass (i.e., yes, if N−1 exist in LUT) (step 610), and determining that the image cannot be reduced to require one less print pass if the lookup table does not include acceptable dimensions for one less print pass (i.e., no, if N−1 does not exist in LUT) (step 608) (step 611).

In an embodiment if the image can be reduced to require one less print pass, then the image may be reduced only if the reduction in the image is not greater than a pre-determined threshold. For example, for customer satisfaction, a printing vendor may limit the reduction in printed image size to not more than 10%. To this end, the method determines whether amount of reduction of the reduced image would be greater than a pre-determined maximum reduction threshold (step 612), and performing a scaling step (step 613) only if the amount of reduction of the reduced image is less than or equal to the pre-determined maximum reduction threshold.

In an embodiment, the amount of scaling, or scaling factor, may be variable and or dynamically determined based on one or more factors. For example, the scaling factor may be set based on:
  a. Type of product (for example, do not allow scaling (scaling factor=0%) for a premium product)
  b. Type of image (for example, do not allow scaling for a licensed image or a premium image)
  c. Type of customer (for example, do not allow scaling for a high value customer's products)
  d. Order Quantity (for example, scale large orders in exchange for offering volume discounts)
  e. Capacity (for example, alter how much we are willing to scale based on actual printing capacity and order rate (e.g., scaling factor higher when less printing capacity or more print orders)

Returning to FIG. 6, if it is determined that the size of the image could (and should) be reduced to require one less print pass by the print apparatus in printing the reduced image, the image is then scaled such that the dimension, $D_{sub\text{-}scan}$, along the sub-scanning axis of the scaled image is such as to require one less print pass by the print apparatus in printing the scaled image than the original image (step 613). In an embodiment, the image is scaled such that the dimension along the sub-scanning axis of the scaled image is a maximum dimension value within a range of dimension values that result in one less print pass ($D_{sub\text{-}scan}$=$D_{MAX\_N-1}$) (step 614). Continuing with the previous example where the image width was determined to be 140 mm (requiring 3 print passes), the image would be scaled such that the scaled image width was 133 mm ($D_{sub\text{-}scan}$=133 mm, the maximum width for a 2-print-pass image). In an embodiment, the dimensions of the image, $D_{sub\text{-}scan}$, $D_{scan}$, corresponding to the sub-scanning axis and the scanning axis, respectively, when the image is printed are scaled proportionally to the dimensions of the original image (step 615). Thus, in the present example, if the width of the image is scaled from 140 mm to 133 mm (which corresponds to a 5% reduction in width), then in this embodiment the height of the image is correspondingly scaled down by 5%.

Finally, if the scaling step is performed, the scaled image is printed on the image receiving medium (step 616). Otherwise, the original image is printed on the image receiving medium (step 617).

In an embodiment, the method is a computer-implemented method embodied on one or more computer readable media have stored thereon computer executable instructions for performing the method.

Figure 7:
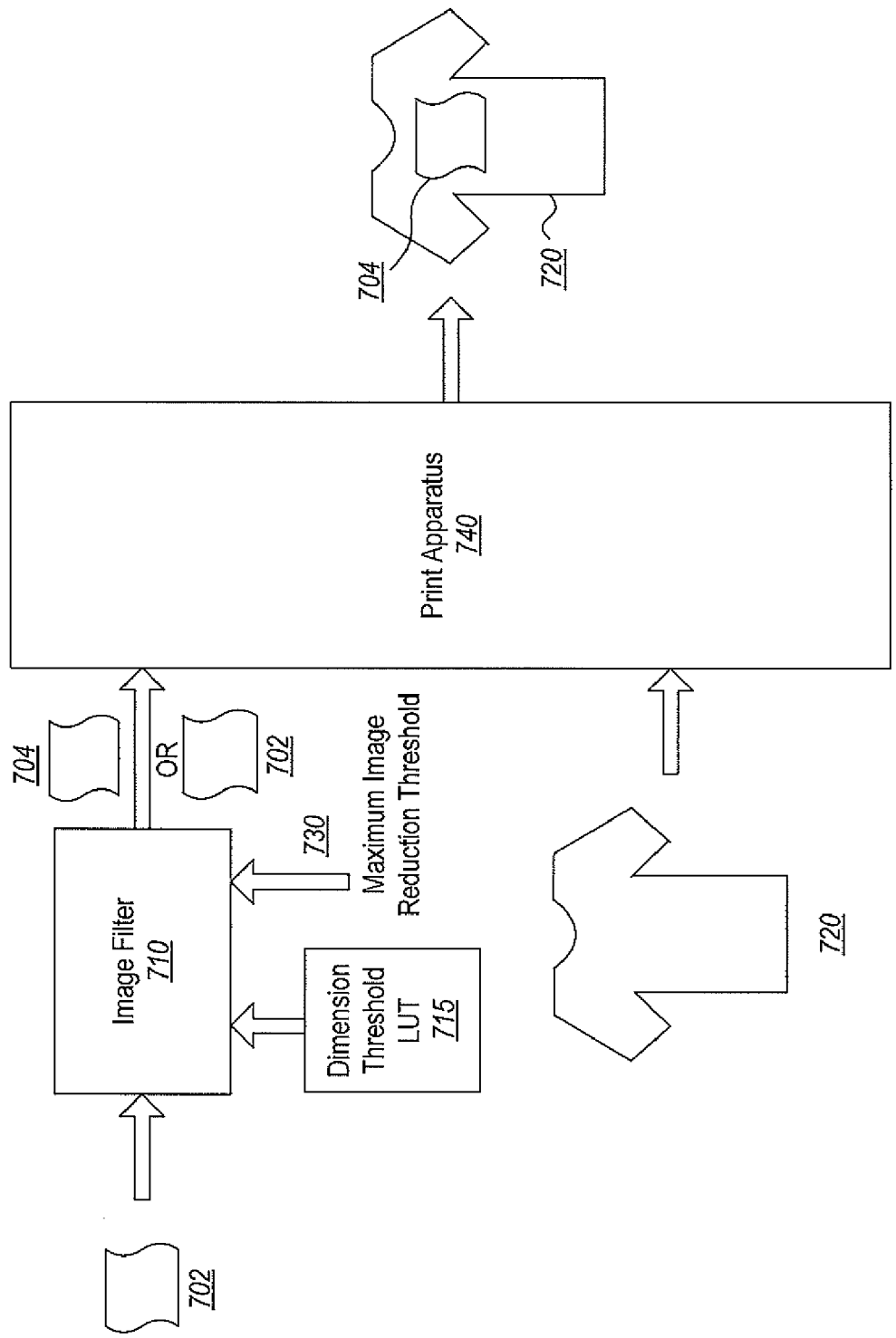
FIG. 7 is a schematic diagram illustrating the use of an image filter within the context of a print system.
Figure 8A:
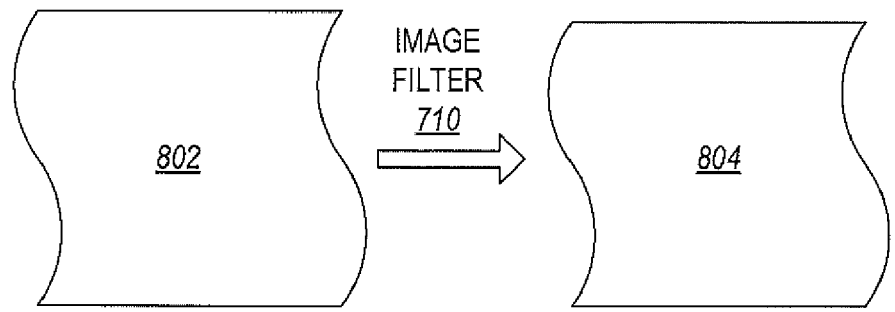
FIG. 8a is a schematic diagram illustrating the filtering of a 5-print-pass-image into a 4-print-pass image.
Figures 8B, 8C:
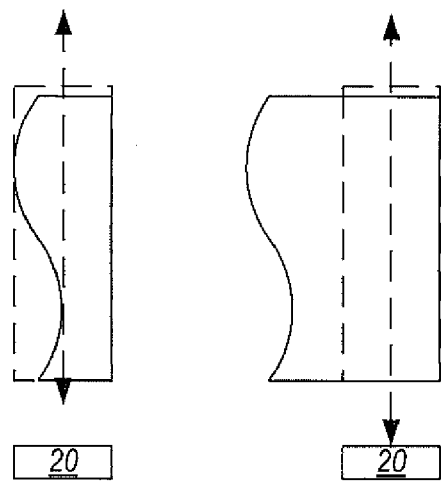
FIGS. 8b, 8c, 8d, and 8e are sequential schematic illustrations of the image as it is printed during operation of the print apparatus of FIG. 1 in the performance of printing a scaled down version of the image to produce a 4-print-pass image.
Figures 8D, 8E:
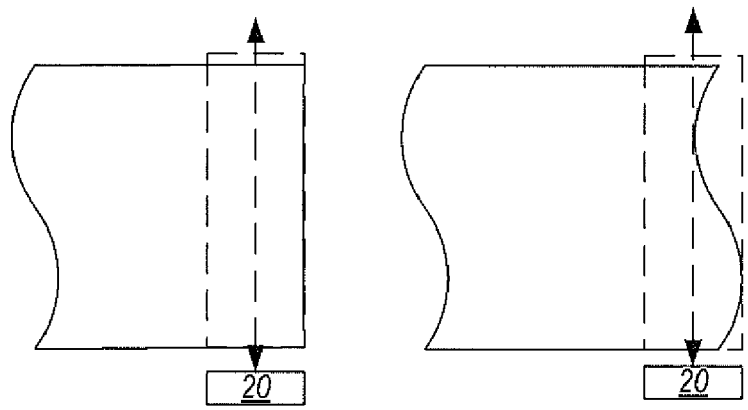

FIG. 7 diagramatically illustrates application of the method 600 to an image that is within a predetermined maximum reduction threshold of a sub-scanning dimension printable with one less print pass. As illustrated, an image 702 such as the 5-pass image 502 shown in FIGS. 5a through 5f, is received to be printed on a print medium 720 (for example, a t-shirt). An image filter 710 receives the image 702 and a maximum image reduction threshold 730 (for example, 10%), and processes the image 702 according to the method of FIG. 6. In an embodiment, the image filter 710 accesses a Dimension Threshold LUT 715 (as exemplified in TABLE 1) to determine the number, N of print passes required to print the image with the current image dimensions, and the dimension threshold of one less print pass (i.e., $D_{MAX\_N-1}$). If the dimensions of the image are such that the image can be reduced at most by a maximum image reduction threshold 730 (e.g., 10%), then the image filter scales the image 702 to generate a scaled image 704 that is sent to the print apparatus 740. The print apparatus 740 prints the image onto the image receiving medium 720, performing one less print pass than it would have had the original image 702 been sent to the print apparatus. Otherwise, the print apparatus 740 receives the original image 702 and prints the original image 702 on the image receiving medium 720.

FIGS. 8a through 8e illustrate an image 802 (such as the 5-print-pass image 502 of FIG. 5a) that is scaled down to produce a scaled image 804, and the resulting printed image after the completion of the first print pass, the second print pass, the third print pass, and the fourth print pass, respectively. Thus, the scaled image 804 is printed by the print apparatus in only four swaths, rather than the five swaths had the original image 802 been sent to the print apparatus.

Figure 9:
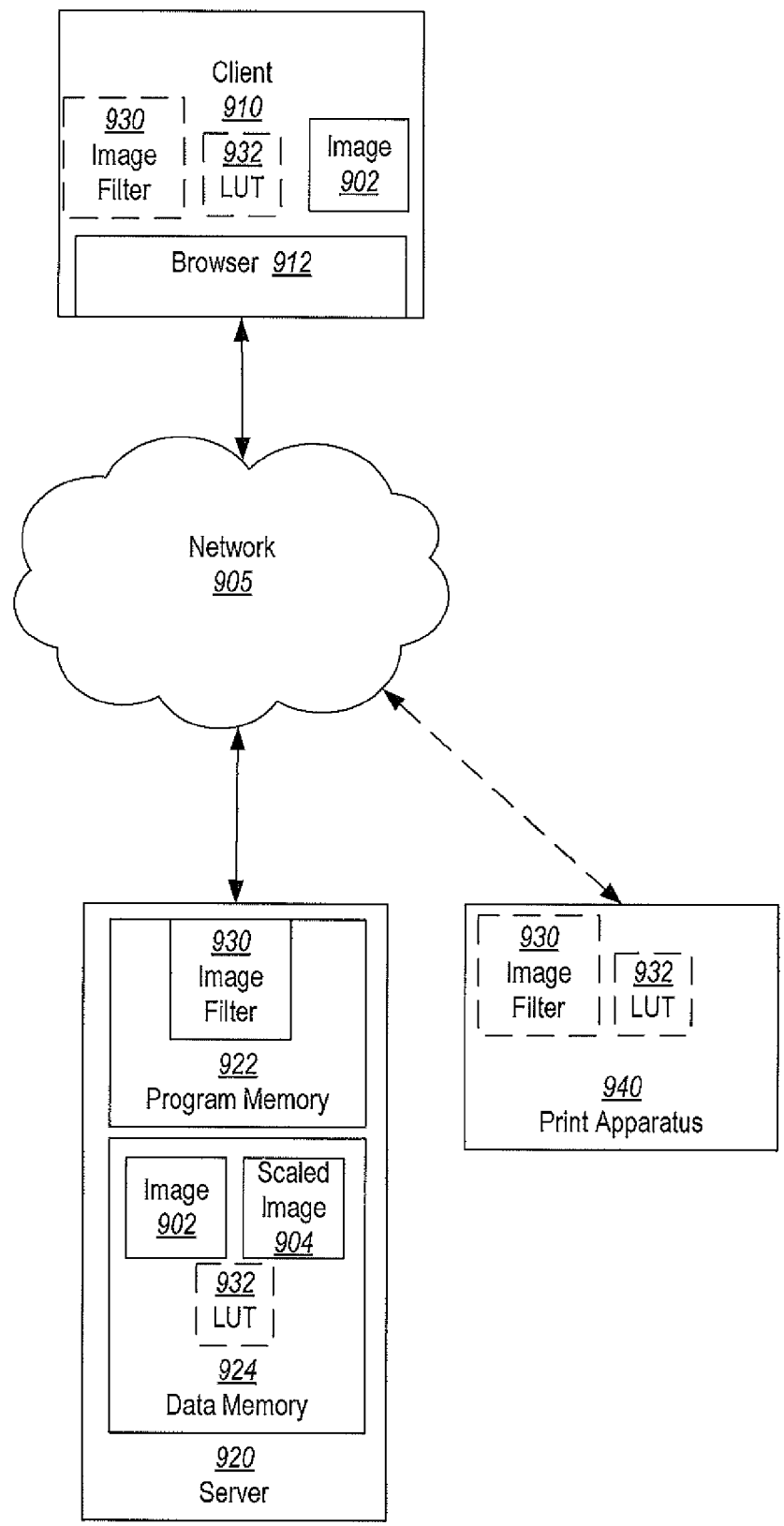
FIG. 9 is a diagram of an exemplary networked system in which the invention may operate.

FIG. 9 depicts one illustrative system with which the invention may be employed. Client 910 represents a user's computer system, for example, a customer of a website hosting service. Client system 910 is a typically equipped modern personal computer, for example a computer system of the type discussed with reference to FIG. 10, being configured to communicate over the Web and running a modern Web browser program 912 such as Microsoft Internet Explorer or other browser programs that support DHTML, XHTML, HTML, XML, and other web functionality.

Client 910 communicates with a server 920 to upload an image 902 to be printed on a print medium such as a t-shirt or other printable product. In an embodiment, the server 920 includes an image filter 930 which processes the uploaded image 902 per the method described in FIG. 6. The dimension thresholds may be determined from the contents of a LUT 932 stored at the server 920, the client 910, or the print apparatus 940. The output of the image filter 930 may be a scaled image 904 if the image meets all of the conditions for image reduction. The server 920 communicates with a print apparatus 940 via the network 905, sending the scaled image 904 to the print apparatus 940 if the image qualifies for reduction, and otherwise sending the original image 902 to the print apparatus 940. The print apparatus 940 prints the image sent to it onto a print medium.

In an alternative embodiment, the image filter 930 resides in program memory 942 at the print apparatus 940 itself and processes the image 902 directly. In either case, the image 902 is processed and scaled, if print pass optimization would result, in real time. That is, the image 902 is processed at the time it is received by either the server 920 or optionally by the print apparatus 940, rather than at the client 910. Alternatively, the image filter 930 could be implemented at the client.

Figure 10:
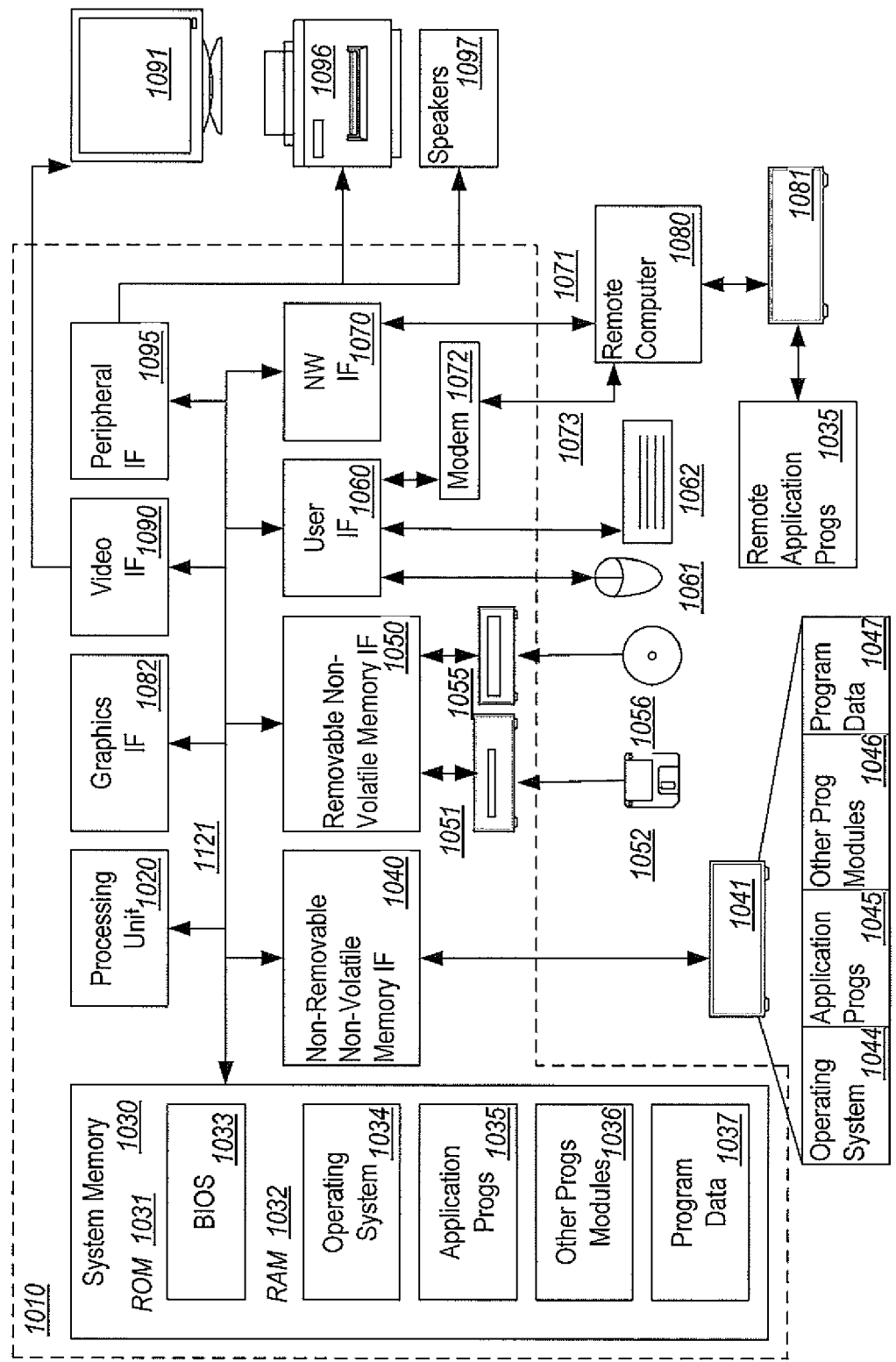
FIG. 10 is an exemplary computer system environment in which the invention may be implemented.

Each of client 910 and server 920, and preferably the print apparatus 940, include processing means, program memory for storing computer readable program instructions, and data memory for storing data such as the image 902 and scaled image 904. An exemplary embodiment of a suitable computing system environment for use in either or both of the client 910 and server 920, and optionally the print apparatus 940 is illustrated in FIG. 10. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000. Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention, and in particular, the image filter 710 and 930, may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 1010. Computer storage media typically embodies computer readable instructions, data structures, program modules or other data.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10 provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Figure 11A:
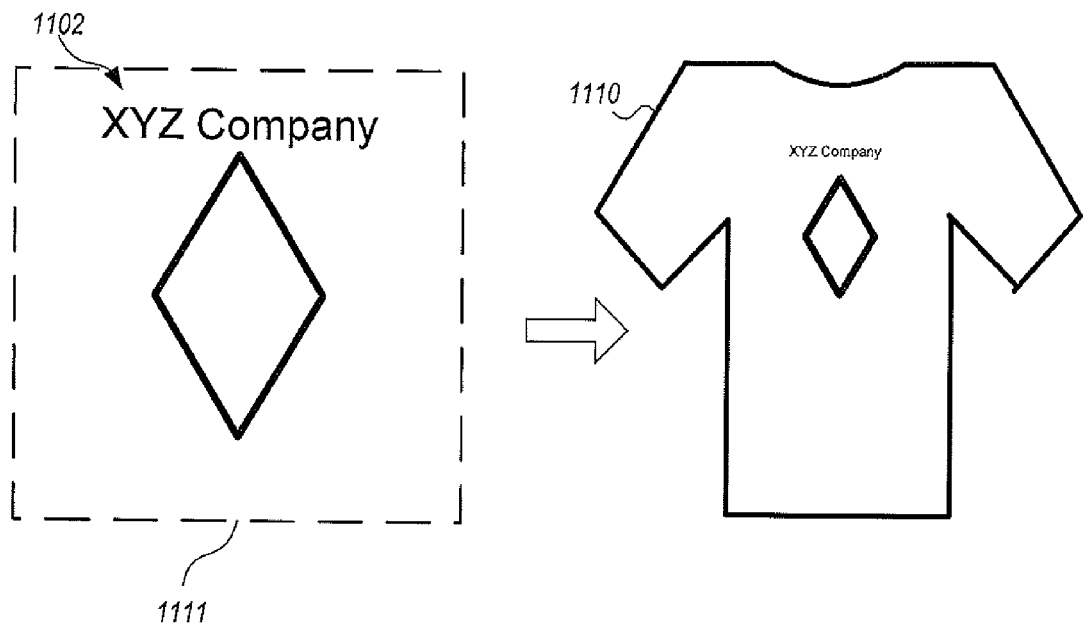
FIGS. 11a and 11b illustrate a blank area cropping technique for optimizing the printing time of an image.

An image filter in accordance with embodiments of the invention may be utilized alone to optimize printing time of an image. Alternatively, the image filter may be utilized in conjunction with other print time optimization features. For example, in U.S. application Ser. No. 11/894,216, entitled "Image Processing to Reduce Image Printing Time", assigned to the same assignee of interest herein and hereby incorporated by reference for all purposes, a technique may be utilized which limits the print area of the image that is traversed by the print heads to a reduced area containing actual image content. Referring to FIG. 11*a*, there is illustrated an example image 1102 which occupies only a limited amount of the full allowable print area printable by a print apparatus. When the image 1102 is printed on the image receiving medium 1110 (for example, a t-shirt as shown), some portions of the allowable printable area (represented by the dotted line) that does not contain actual image content need not actually be traversed by the print head(s) of the print apparatus. Accordingly, the initial coordinates of the print head may be set such that only the area within the full allowable print area where the print heads actually deposit ink is traversed.

Figure 11B:
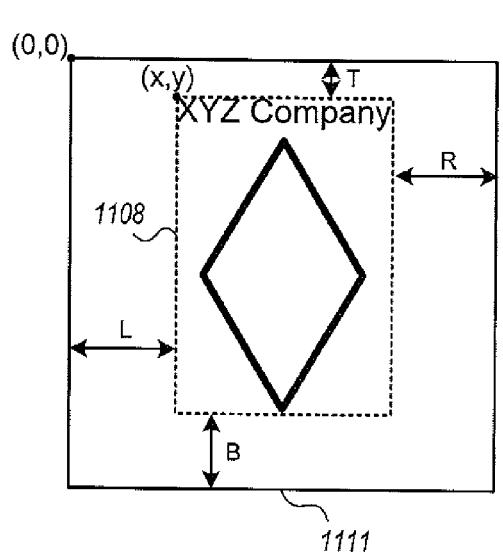

As described in more detail in U.S. application Ser. No. 11/894,216, and illustrated in FIG. 11*b*, an actual print area 1108 containing actual print content within the full allowable print area 1111 is defined. In an embodiment, the actual print area 1108 is bounded on the top by the top pixel in the image 1102 having actual print content, on the left by the left-most pixel in the image having actual print content, on the bottom by the bottom-most pixel in the image having actual print content, and on the right by the right-most pixel in the image having actual print content. The content of the allowable print area 1111 is cropped to equal to L from the left edge, R from the right edge, T from the top edge, and B from the bottom edge. The cropped image corresponding to the actual print area 1108 of the design 1111 is sent to the print apparatus along with the offset coordinates, for example the offset coordinates of the top left corner of the actual print area 1108 to instruct the print apparatus where on the image receiving medium that the image is actually positioned. In an embodiment, the width of the image (along the sub-scanning axis) is defined as the x-axis and the height of the image (along the scanning axis) is defined as the y-axis. Thus, if the coordinates of the upper left corner of an image taking up the entire allowable print area 1111 is defined as (0, 0), the offset of the actual print area 1108 will be (x, y), as illustrated in FIG. 11*b*. Essentially, the design is cropped to reduce the blank space surrounding the actual printable content, and offset information is added to the file so that the print apparatus is instructed where to place the printed image on the image receiving medium (t-shirt).

Figure 11C:
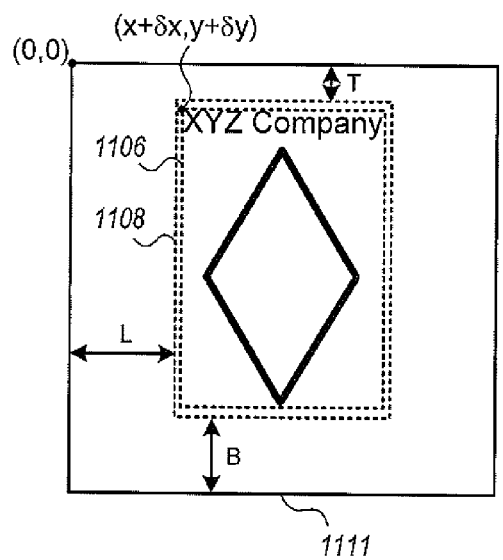
FIG. 11c illustrates adjustment of the print head offsets after applying the print pass optimization technique of the present invention to such a previously cropped image.

In this type of print time optimization system, the print pass optimization image filter can be additionally applied to scale the cropped image to reduce the number of print passes required to print the actual print area of the image. For example, as illustrated in FIG. 11*c*, after an image is scaled, the offset coordinates (x, y) are then adjusted to the new coordinates (x+δx, y+δy) of the upper left corner of the scaled image 1106 within the full allowable print area 1111. The offsets (x+δx, y+δy) may be adjusted slightly differently in the horizontal and vertical) to attempt to keep things looking perceptually the same. As a non-limiting example, if the image receiving medium 1110 is a t-shirt, it may be desirable to print the image so that it always starts in the same vertical position, whereas horizontally, it should always be centered. Thus, the offsets (x+δx, y+δy) may be (x+δx, y) in this non-limiting example.

While an exemplary embodiment of the invention has been discussed, the described embodiment is to be considered as illustrative rather than restrictive. For example, in the embodiment discussed above, the width of the image to be printed is depicted as being along the sub-scanning axis. Alternatively, medium may be printed by the print apparatus so as to orient the image such that it is height of the image that corresponds to the sub-scanning axis of the print apparatus. In this alternate embodiment, the sub-scanning dimension of the image would be taken to be the height of the image rather than the width of the image, and the scanning dimension of the image would be taken to be the width of the image rather than the height of the image. The scope of the invention is as indicated in the following claims and all equivalent methods and systems.

What is claimed is:

1. A method for processing an image to optimize print time of the image by a print apparatus, the print apparatus comprising a print medium stage which holds a print medium on which the image is to be printed, at least one print head having at least one nozzle which deposits ink on the print medium during printing, a scan control mechanism which controls relative movement of the print medium stage and the at least one print head along a scanning axis during deposition of ink from the at least one nozzle, a print head displacement control mechanism which displaces the at least one print head relative to the print medium stage along a sub-scanning axis perpendicular to the scanning axis, the print apparatus configured to print the image on the print medium in a sequence of print passes, each print pass resulting in the printing, along the scanning axis, of a single printed swath of the image, wherein the number of swaths of the printed image depending on the dimension of the image along the sub-scanning axis, the method comprising:

determining a dimension of the image corresponding to the dimension along the sub-scanning axis of the image as it will be printed by the print apparatus;

determining a number of print passes required to print the image having the determined dimension;

determining whether the size of the image could be reduced to require one less print pass by the print apparatus in printing the reduced image;

determining whether the amount of reduction of the reduced image would be greater than a pre-determined maximum reduction threshold; and if it is determined that the size of the image could be reduced to require one less print pass by the print apparatus in printing the reduced image and the amount of reduction of the reduced image is less than or equal to the pre-determined maximum reduction threshold, scaling the image by a scaling factor such that the dimension along the sub-scanning axis of the scaled image is such as to require one less print pass by the print apparatus in printing the scaled image than the original image.

2. The method of claim 1, wherein:

the step of scaling the image comprises scaling the image such that the dimension along the sub-scanning axis of the scaled image is a maximum dimension value within a range of dimension values that result in one less print pass.

3. The method of claim 1, wherein the dimensions along the scanning axis and the sub-scanning axis of the image are scaled proportionally to the dimensions of the original image.

4. The method of claim 3, wherein:

the step of scaling the image comprises scaling the image such that the dimension along the sub-scanning axis of the scaled image is a maximum dimension value within a range of dimension values that result in one less print pass.

5. The method of claim 1, wherein:

the step of scaling the image comprises scaling the image such that the dimension along the sub-scanning axis of the scaled image is a maximum dimension value within a range of dimension values that result in one less print pass.

6. The method of claim 1, comprising:

printing the scaled image if the scaling step is performed; and printing the original image if the scaling step is not performed.

7. The method of claim 1, wherein the step of determining a number of print passes required to print the image having the determined dimension comprises:

utilizing the determined dimension to obtain the corresponding number of print passes from a lookup table.

8. The method of claim 1, wherein the step of determining whether the size of the image could be reduced to require one less print pass by the print apparatus in printing the reduced image comprises:

determining whether the number of print passes required to print the image is greater than the lowest possible number of print passes when printing the smallest size image printable by the print apparatus;

determining that the image can be reduced to require one less print pass if the number of print passes required to print the image is greater than the lowest possible number of print passes; and determining that the image cannot be reduced to require one less print pass if the number of print passes required to print the image is equal to the lowest possible number of print passes.

9. The method of claim 1, wherein the step of determining whether the size of the image could be reduced to require one less print pass by the print apparatus in printing the reduced image comprises:

utilizing the determined dimension to obtain the corresponding number of print passes from a lookup table;

determining whether the lookup table includes acceptable dimensions for one less print pass;

determining that the image can be reduced to require one less print pass if the lookup table includes acceptable dimensions for one less print pass; and determining that the image cannot be reduced to require one less print pass if the lookup table does not include acceptable dimensions for one less print pass.

10. The method of claim 1, wherein the scaling factor is variable and dynamically determined based on one or more of a type of which the printed image will become, a type of image to be printed, a type of customer for which the image is to be printed, a quantity of the image to be printed, and a printing capacity available for printing.

11. The method of claim 1, further comprising:

receiving print head offset information which is interpretable by the print apparatus in setting an initial offset of the at least one print head for printing the image in a desired location on an image receiving medium; and if the image is scaled, generating adjusted offset information which is interpretable by the print apparatus in setting the initial offset of the at least one print head for printing the image in the desired location on the image receiving medium.

12. One or more non-transitory computer readable media tangibly embodying program instructions which, when executed by a computer, implemented the method of claim 1.

13. A print apparatus comprising:

a print medium stage which holds a print medium on which an image is to be printed;

at least one print head having at least one nozzle which deposits ink on the print medium during printing;

a scan control mechanism which controls relative movement of the print medium stage and the at least one print head along a scanning axis during deposition of ink from the at least one nozzle;

a print head displacement control mechanism which displaces the at least one print head relative to the print medium stage along a sub-scanning axis perpendicular to the scanning axis;

the print apparatus configured to print the image on the print medium in a sequence of print passes, each print pass resulting in the printing, along the scanning axis, of a single printed swath of the image, wherein the number of swaths of the printed image depending on the dimension of the image along the sub-scanning axis; and an image filter configured to determine a dimension of the image corresponding to the dimension along the sub-scanning axis of the image as it will be printed by the print apparatus, determine a number of print passes required to print the image having the determined dimension, determine whether the size of the image could be reduced to require one less print pass by the print apparatus in printing the reduced image, determine whether the amount of reduction of the reduced image would be greater than a pre-determined maximum reduction threshold, and if it is determined that the size of the image could be reduced to require one less print pass by the print apparatus in printing the reduced image and the amount of reduction of the reduced image is less than or equal to the pre-determined maximum reduction threshold, scale the image by a scaling factor prior to printing such that the dimension along the sub-scanning axis of the scaled image is such as to require one less print pass by the print apparatus in printing the scaled image than the original image.

14. An image filtering apparatus for processing an image to optimize print time of the image by a print apparatus, the print apparatus comprising a print medium stage which holds a print medium on which the image is to be printed, at least one print head having at least one nozzle which deposits ink on the print medium during printing, a scan control mechanism which controls relative movement of the print medium stage and the at least one print head along a scanning axis during deposition of ink from the at least one nozzle, a print head displacement control mechanism which displaces the at least one print head relative to the print medium stage along a sub-scanning axis perpendicular to the scanning axis, the print apparatus configured to print the image on the print medium in a sequence of print passes, each print pass resulting in the printing, along the scanning axis, of a single printed swath of the image, wherein the number of swaths of the printed image depending on the dimension of the image along the sub-scanning axis, the image filtering apparatus comprising:

one or more processors configured to determine a dimension of the image corresponding to the dimension along the sub-scanning axis of the image as it will be printed by the print apparatus;

determine a number of print passes required to print the image having the determined dimension;

determine whether the size of the image could be reduced to require one less print pass by the print apparatus in printing the reduced image; and determining whether amount of reduction of the reduced image would be greater than a pre-determined maximum reduction threshold;

scale the image by a sealing factor such that the dimension along the sub-scanning axis of the scaled image is such as to require one less print pass by the print apparatus in printing the scaled image than the original image if it is determined that the size of the image could be reduced to require one less print pass by the print apparatus in printing the reduced image and the amount of reduction of the reduced image is less than or equal to the pre-determined maximum reduction threshold.

15. The image filtering apparatus of claim 14, wherein the image is processed in real time.

16. The image filtering apparatus of claim 14 implemented on a server system which sends one or the other of the image and the scaled image to the print apparatus for printing.

17. The image filtering apparatus of claim 14 implemented in the print apparatus.

* * * * *